United States Patent
Lewin et al.

(10) Patent No.: US 11,831,616 B2
(45) Date of Patent: Nov. 28, 2023

(54) REVERSE PROXY SERVERS FOR IMPLEMENTING APPLICATION LAYER-BASED AND TRANSPORT LAYER-BASED SECURITY RULES

(71) Applicant: Microsoft Technology Licensing, LLC, Redmond, WA (US)

(72) Inventors: Guy Lewin, Tel Aviv (IL); Vitaly Khait, Yavne (IL); Yossi Haber, Gannei Tikva (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 611 days.

(21) Appl. No.: 16/828,612

(22) Filed: Mar. 24, 2020

(65) Prior Publication Data
US 2021/0306303 A1    Sep. 30, 2021

(51) Int. Cl.
*H04L 9/40* (2022.01)

(52) U.S. Cl.
CPC ........ *H04L 63/0281* (2013.01); *H04L 63/083* (2013.01); *H04L 63/102* (2013.01); *H04L 63/166* (2013.01); *H04L 63/168* (2013.01); *H04L 63/20* (2013.01)

(58) Field of Classification Search
CPC . H04L 63/0281; H04L 63/083; H04L 63/102; H04L 63/166; H04L 63/168; H04L 63/20
See application file for complete search history.

(56) References Cited

U.S. PATENT DOCUMENTS 7,818,435 B1 * 10/2010 Jellinek ............... H04L 67/2895
709/219
2020/0092289 A1   3/2020 Mital et al.

FOREIGN PATENT DOCUMENTS

CN   107222561 A  *  9/2017
CN   109547519 A  *  3/2019

OTHER PUBLICATIONS

"International Search Report & Written Opinion issued in PCT Application No. PCT/US21/016689", dated Apr. 1, 2021, 12 Pages.
(Continued)

*Primary Examiner* — Matthew Smithers
*Assistant Examiner* — Shu Chun Gao
(74) *Attorney, Agent, or Firm* — Weaver IP L.L.C.

(57) ABSTRACT

The implementation of application layer-based and transport-layer based security rules via a reverse proxy server chain is described. Each reverse proxy server in the chain is configured to perform a particular function with respect to client messages intended for a destination server and/or convey contextual information pertaining to the messages to a subsequent reverse proxy server in the chain. For instance, a first reverse proxy server in the chain is configured to include client-specific metadata in the transport layer of the message. A second reverse proxy server in the chain enforces transport layer-based policy rules based on the metadata. This enables the second reverse proxy server to manage transport layer connections on a client-by-client basis, thereby enabling the second reverse proxy server to block unauthorized clients, while maintaining the transport layer connections for authorized clients. A third reverse proxy server in the chain enforces application layer-based policy rules.

20 Claims, 6 Drawing Sheets

(56) References Cited

OTHER PUBLICATIONS

Sommerlad, Peter, "Reverse Proxy Patterns", Retrieved From: https://hillside.net/europlop/HillsideEurope/Papers/EuroPLoP2003/2003_Sommerlad_ReverseProxyPatterns.pdf, Jan. 1, 2003, 27 Pages.

* cited by examiner

REVERSE PROXY SERVERS FOR IMPLEMENTING APPLICATION LAYER-BASED AND TRANSPORT LAYER-BASED SECURITY RULES

BACKGROUND

In a Web environment, clients communicate with Web servers using the Hypertext Transfer Protocol (HTTP). The Web servers provide users with access to files such as text, graphics, images, sound, video, etc. For improved security, reverse proxy servers may be used that represent a secure Web server to outside clients. Outside clients are not allowed to access the Web server directly. Instead, their requests are sent to the reverse proxy server, which then forwards the client requests to the Web server. The reverse proxy server returns the completed request to the client while hiding the identity of the Web server from the client. This prevents the outside clients from obtaining direct, unmonitored access to the Web server.

Reverse proxy servers may also be utilized to enforce security rules that are implemented to selectively provide clients access to a Web server. However, such proxy servers are only limited to monitoring the HTTP layer of the incoming requests, Consequently, such proxy servers are only limited to monitoring and preventing unauthorized read/write operations to a Web server, while still allowing unauthorized clients to connect to the Web server.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for implementing application layer-based and transport-layer based security rules. For instance, as described herein, reverse proxy servers are coupled in a chainlike fashion. Each reverse proxy server in the chain is configured to perform a particular function with respect to request messages received from clients that are intended for a destination server. The reverse proxy servers in the chain also convey contextual information pertaining to the request messages to subsequent reverse proxy servers in the chain that is not typically known thereto. For instance, an application layer reverse proxy server in the chain is configured to include client-specific metadata (which is typically located in the application layer of a request message) in the transport layer of the request message. A subsequent transport layer reverse proxy server in the chain enforces transport layer-based policy rules based on the metadata. This enables the transport layer reverse proxy server to manage transport layer connections on a user-by-user basis, thereby enabling the transport layer reverse proxy server to block unauthorized clients from accessing the destination server, while maintaining the transport layer connections for authorized clients. Another application layer reverse proxy in the chain enforces application layer-based policy rules based on the metadata. For instance, the application layer reverse proxy determines whether a particular client is authorized to perform an operation (e.g., a read or write operation) with respect to a resource provided by the destination server.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
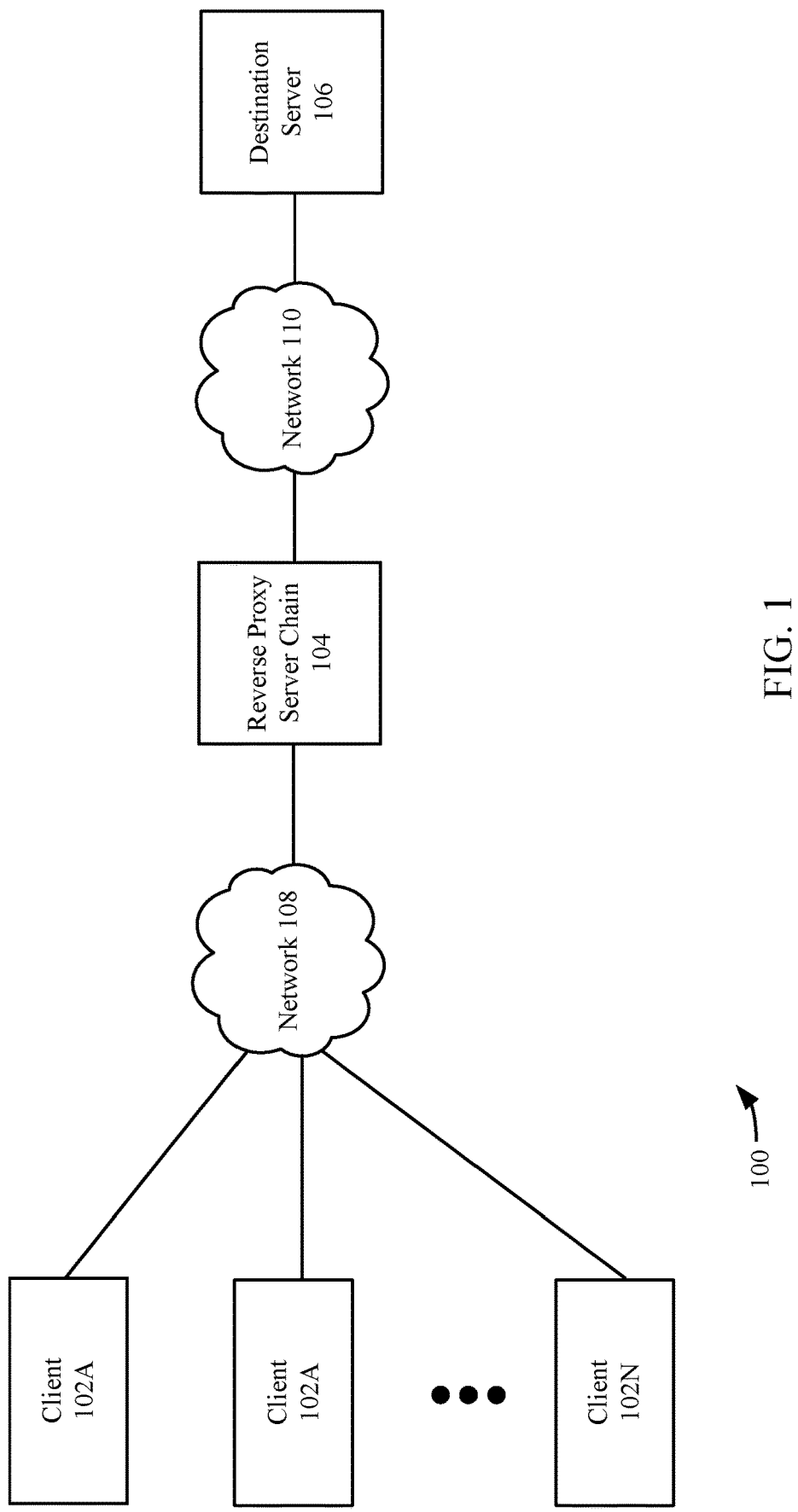
FIG. 1 shows a block diagram of a system for implementing security rules via a reverse proxy server chain in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embodiments described herein are directed to reverse proxy servers that are configured to implement application layer-based and transport-layer based security rules. For instance, as described herein, reverse proxy servers are coupled in a chainlike fashion. Each reverse proxy server in the chain is configured to perform a particular function with respect to request messages received from clients that are intended for a destination server. Proxy servers in the chain also convey contextual information pertaining to the request messages to subsequent reverse proxy servers in the chain that is not typically known thereto. For instance, a first application layer reverse proxy server in the chain is configured to include client-specific metadata (which is typically located in the application layer of a request message) in the transport layer of the request message. A subsequent transport layer reverse proxy server in the chain enforces transport layer-based policy rules based on the metadata. This advantageously enables the transport layer reverse proxy server to manage transport layer connections on a user-by-user basis, thereby enabling the transport layer reverse proxy server to block unauthorized clients from accessing the destination server, while maintaining the transport layer connections for authorized clients. Another application layer reverse proxy server in the chain enforces application layer-based policy rules based on the metadata. For instance, the application layer reverse proxy server determines whether a particular client is authorized to perform an operation (e.g., a read or write operation) with respect to a resource provided by the destination server.

The techniques described herein provide robust client-specific security measures on both the application layer and the transport layer. Conventional transport layer reverse proxy servers do not have access to client-specific metadata and effectively treat all clients as a single client. As such, such conventional proxy servers utilize a single connection between a reverse proxy and a destination server for all clients providing request messages to the destination server. Thus, if a connection is terminated responsive to a determination that a single client is not authorized to access a destination server, all clients utilizing the connection are also prevented from accessing the destination server. This is detrimental to valid clients that are authorized to access destination server. The techniques described herein advantageously avoid this issue by establishing a respective connection with each client (rather than establishing a single connection for all clients) that can each be individually terminated based on the client-specific metadata made available to the transport layer reverse proxy.

Moreover, distributing the functionality across different reverse proxy servers in a proxy server chain allows for the selective deployment of reverse proxy servers, where only the reverse proxy servers that perform the desired functionality are deployed. This advantageously enables the customization of functionality that can be utilized for a particular scenario and also distributes the load between the deployed proxy servers, thereby reducing the processing overhead for a given proxy server.

For instance, FIG. 1 shows a block diagram of a system 100 for implementing security rules via a reverse proxy server chain in accordance with an embodiment. As shown in FIG. 1, system 100 includes a plurality of clients 102A-102N, a reverse proxy server chain 104, and a destination server 106. Each of clients 102A-102N are communicatively coupled to reverse proxy server chain 104 via a first network 108. Reverse proxy server chain 104 is communicatively coupled to destination server 106 via a second network 110. Each of networks 108 and 110 may comprise one or more networks such as local area networks (LANs), wide area networks (WANs), enterprise networks, the Internet, etc., and may include one or more of wired and/or wireless portions.

Each of clients 102A-102N, reverse proxy server chain 104 and destination server 106 are configured to implement a request-response protocol in which request messages are transmitted thereby and messages responsive to the request messages are received. In accordance with an embodiment, each of clients 102A-102N, reverse proxy server chain 104 and destination server 106 are configured to transmit hypertext transfer protocol (HTTP) requests and receive HTTP responses. For example, each of clients 102A-102N are configured to execute a browser application (i.e. a Web browser) that is configured to transmit and receive such requests and responses. The browser application enables network information resources to be retrieved, presented, and traversed. An information resource may be accessed by the browser application using a network address, such as a uniform resource identifier (URI). Examples of information resources include web pages, images, videos, and other forms of content. Examples of a browser application include Microsoft Edge®, published by Microsoft Corp. of Redmond, Washington, Mozilla Firefox®, published by Mozilla Corp. of Mountain View, California, Safari®, published by Apple Inc. of Cupertino, California, and Google® Chrome, published by Google Inc. of Mountain View, California.

In accordance with another embodiment, each of clients 102A-102N, reverse proxy server chain 104 and destination server 106 are configured to transmit remote desktop protocol (RDP) requests and receive RDP responses. For example, each of clients 102A-102N reverse proxy server chain 104 and destination server 106 are configured to execute an RDP client application that is configured to transmit and receive such requests and responses. Examples of RDP client applications include, but are not limited to Remote Desktop Connection™, published by Microsoft Corp, VirtualBox Remote Display Protocol™, published by Oracle Corp. of Redwood City, California, open source software application, FreeRDP, etc.

In accordance with a further embodiment, each of clients 102A-102N, reverse proxy server chain 104 and destination server 106 are configured to transmit server message block (SMB) requests and receive SMB responses. For example, each of clients 102A-102N are configured to execute an SMB client application that is configured to transmit and receive such requests and responses. Examples of SMB client applications include, but are not limited to Samba, Netsmb, etc.

In accordance with yet another embodiment, each of clients 102A-102N, reverse proxy server chain 104 and destination server 106 are configured to transmit Secure Shell (SSH) requests and receive SSH responses. For example, each of clients 102A-102N, reverse proxy server chain 104 and destination server 106 are configured to execute an SSH client application that is configured to transmit and receive such requests and responses. Examples of SSH client applications include, but are not limited to AbsoluteTelnet™, ConnectBot™, SecureCRT, etc.

It is noted that the request-response protocols described above are purely exemplary and that each of clients 102A-102N, reverse proxy server chain 104 and destination server 106 may be configured to implement and execute other request-response protocols.

Each of clients 102A-102N may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer).

Reverse proxy server chain 104 comprises a plurality of reverse proxy servers that are communicatively coupled in a chainlike fashion. Reverse proxy server chain 104 is positioned in front of destination server 106 such that reverse proxy server chain 104 can service requests from any client (e.g., clients 102A-102N). As such, the reverse proxy servers of reverse proxy server chain 104 are different than a forward proxy server, which is positioned in front of a specific group on one or more clients and serves as an intermediary for such clients to contact any server. In order words, a forward proxy server acts on behalf of a client, while a reverse proxy server acts on behalf of a server (e.g., destination server 106).

Reverse proxy server chain 104 is configured to implement security policies to protect destination server 106 (and the resources provided thereby) from unauthorized access and operations. For example, reverse proxy server chain 104 is configured to manage transport layer (e.g., transmission control protocol (TCP)) activity between clients 102A-102N and destination server 106 and determine whether a particular client of clients 102A-102N is authorized to communicate with destination server 106 based on the request made by the client. Responsive to determining that a client of clients 102A-102N is not authorized to communicate with destination server 106, reverse proxy server chain 104 terminates the client's connection to reverse proxy server chain 104 while maintaining an authorized client's connection, thereby preventing access to destination server 106 by only unauthorized clients. Reverse proxy server chain 104 is also configured to manage application layer (e.g., HTTP) activity between clients 102A-102N and destination server 106 and determine whether a particular client of clients 102A-102N is authorized to perform an operation with respect to the resources provided by destination server 106 based on the request made by the client.

As will be described below with reference to FIG. 2, each reverse proxy server of reverse proxy server chain 104 is configured to perform a particular function to implement the foregoing features. For example, a first reverse proxy server is configured to manage transport layer activity, and a second reverse proxy server is configured to manage application layer activity. Other reverse proxy servers in reverse proxy server chain 104 may be configured to perform other types of functions. Distributing the functionality in such a manner (rather than incorporating all the functionality into a single reverse proxy server) allows for the selective deployment of reverse proxy servers, where only the reverse proxy servers that perform the desired functionality are deployed. This advantageously enables the customization of functionality that can be utilized for a particular scenario and also distributes the load between the deployed proxy servers, thereby reducing the processing overhead for a given proxy server.

One or more of reverse proxy servers in reverse proxy server chain 104 may be implemented via a physical computing device, a virtual machine executing on a physical computing device, and/or any type of device comprising one or more processors and/or memories that is configured to process data. Examples of a computing device include but are not limited to, a desktop computer or PC (personal computer), a server, a computing node in a cloud-based environment, an Internet-of-Things (IoT) device, a personal digital assistant (PDA), a laptop computer, a notebook computer, a tablet computer, a netbook, a smart phone, a wearable computing device (e.g., a head-mounted device including smart glasses, a virtual headset, a smart watch, etc.) and/or the like. Alternatively, one or more reverse proxies in reverse proxy server chain 104 may be implemented as a software application that executes on a physical computing device or virtual machine or may be implemented as a containerized application configured to execute via a container engine executing on a physical computing device. An example of a container engine includes, but is not limited to Docker®, published by Docker®, Inc.

Destination server 106 (also referred to as an origin server) is configured to process and respond to incoming request messages (e.g., HTTP requests, SSH requests, RDP requests, SMB requests, etc.) originating from clients 102A-102N. Destination server 106 provides resources and/or Web applications that are accessible by clients 102A-102N via reverse proxy server chain 104. Examples of Web applications include, but are not limited to Web email applications (e.g., Gmail®, published by Google Inc.), Outlook.com™ published by Microsoft Corp, etc.), file sharing applications (e.g., Dropbox®, published by Dropbox, Inc. of San Francisco, California, etc.), productivity applications (e.g., Office 365®, published by Microsoft Corp, Google Apps™, published by Google, Inc., etc.), etc. It is noted that while FIG. 1 shows destination server 106 as a single server, destination server 106 may comprise any number of servers.

Figure 2:
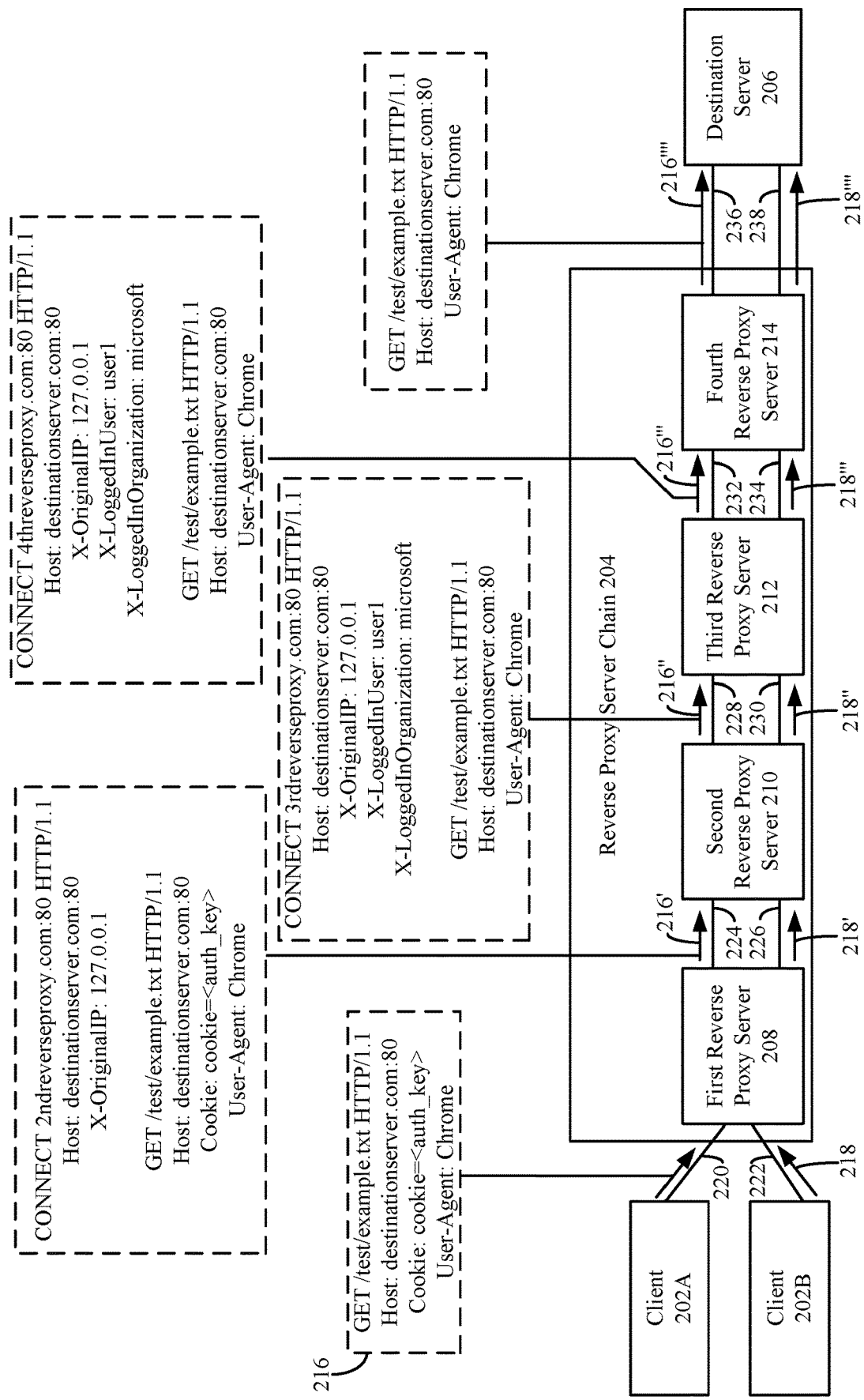
FIG. 2 shows a block diagram of a system for implementing security rules via a reverse proxy server chain in accordance with another example embodiment.

FIG. 2 shows a block diagram of a system 200 for implementing security rules via a reverse proxy server chain in accordance with another embodiment. As shown in FIG. 2, system 200 includes a first client 202A, a second client 202B, a reverse proxy server chain 204, and a destination server 206. First client 202A and second client 202B are examples of clients 102A-102N, reverse proxy server chain 204 is an example of reverse proxy server chain 104, and destination server 206 is an example of destination server

106, as respectively described above with reference to FIG. 1. Reverse proxy server chain 204 comprises a plurality of reverse proxy servers. For example, as shown in FIG. 2, reverse proxy server chain 204 includes a first reverse proxy server 208, a second reverse proxy server 210, a third reverse proxy server 212, and a fourth reverse proxy server 214.

Each of clients 202A and 202B is configured to transmit request messages that are intended for destination server 206. For example, as shown in FIG. 2, first client 202A transmits a request message 216, and second client 202B transmits a request message 218. To transmit request message 216, client software (e.g., a browser application) executing on client 202A first establishes a transport layer connection 220 with first reverse proxy server 208 and transmits request message 216 to first reverse proxy server 208 via connection 220. To transmit request message 218, client software (e.g., a browser application) executing on client 202B first establishes a transport layer connection 222 with first reverse proxy server 208 and transmits request message 218 to first reverse proxy server 208 via connection 220. In accordance with an embodiment, the transport layer is in accordance with a transmission control protocol (TCP) although the embodiments described herein are not so limited. In accordance with such an embodiment, each of clients 202A and 202B exchange SYN and ACK control messages with first reverse proxy server 208 to establish connections 220 and 222, respectively.

In accordance with an embodiment, request messages 220 and 222 are hypertext transfer protocol (HTTP) messages, which comprise application layer (e.g., HTTP) information. Such information is shown in FIG. 2 with respect to request message 220. As shown in FIG. 2, request message 220 comprises a GET method, which specifies the operation (i.e., a read operation) to be performed with respect to a resource ("example.txt") and a path ("/test/") at which the resource is stored by destination server 206. The version of the application layer protocol used to transmit request message 220 is also specified (i.e., "HTTP/1.1"). Request message 220 also specifies a hostname (e.g., "destinationserver.com") that identifies the destination server (e.g., destination server 206) for which request message 220 is intended and the port number (e.g., 80) utilized for connection 220. Request message 220 may also comprise a cookie (e.g., "cookie=<auth_key>") comprising metadata (e.g., authentication information) associated with client 202A. For example, the metadata may comprise a username associated with a user of client 202A, a password associated with the username, a personal identification number (PIN), etc. Request message 220 may further comprise an identifier of the application that transmitted request message 220 (e.g., User-Agent: Chrome). In this example, the application is the Chrome® browser application.

First reverse proxy server 208 is configured to receive request messages 216 and 218 via connections 220 and 222, respectively. First reverse proxy server 208 is an application layer reverse proxy that is configured to analyze and/or interpret application layer information included in request messages 216 and 218 (i.e., the information shown for request message 220 shown in FIG. 2). For example, first reverse proxy server 208 is an HTTP reverse proxy. In accordance with an embodiment, the application layer is in accordance with an HTTP protocol although the embodiments described herein are not so limited.

First reverse proxy server 208 is configured to provide context regarding clients 202A and 202B for a subsequent reverse proxy server in reverse proxy server chain 204 that is a transport layer reverse proxy server. For example, first reverse proxy server 208 is configured to provide context for third reverse proxy server 212, which is a transport layer reverse proxy. As will be described below, third reverse proxy server 212 utilizes the context information to determine whether a client (e.g., clients 202A and 202B) is authorized to communicate with destination server 206. In accordance with an embodiment, first reverse proxy server 208 includes the context information into an HTTP CONNECT method header of request message 216 and provides the modified request message (shown as request message 216') to the next reverse proxy in the chain (e.g., second reverse proxy server 210).

For instance, as shown in FIG. 2 (with reference to modified request message 216'), first reverse proxy server 208 modifies request message 216 to include an HTTP CONNECT method, which is stored in the transport layer of request message 216'. The HTTP CONNECT method specifies the hostname of the next reverse proxy server (e.g., 2ndreverseproxy.com) in reverse proxy server chain 204 (i.e., second reverse proxy server 210). First reverse proxy server 208 also includes an identifier of the client (i.e., client 202A) that transmitted request message 220 in the HTTP CONNECT header. In accordance with an embodiment, first reverse proxy server 208 includes the internet protocol (IP) address (e.g., 127.0.0.1) of client 202A and/or the identifier of destination server 206, which may be obtained from the IP layer of request message 220. First reverse proxy server 208 also maintains the original application layer information of request message 220. To transmit request message 216' to second reverse proxy server 210, first reverse proxy server 208 establishes a transport layer connection 224 with second reverse proxy server 210 and transmits modified request message 216' to second reverse proxy server 210 via connection 224. As further shown in FIG. 2, first reverse proxy server 208 also establishes a transport layer connection 226 with second reverse proxy server 210 to provide request message 218' to second reverse proxy server 210. First reverse proxy server 208 modifies request message 218 to generate request message 218' in a similar manner as request message 216, as described above. The contents of request message 218' are not shown for the sake of brevity.

Second reverse proxy server 210 is configured to receive request messages 216' and 218' from first reverse proxy server 208 via connections 224 and 226, respectively. Second reverse proxy server 210 is an application layer reverse proxy that is configured to analyze and/or interpret both application layer information and transport layer information included in the request messages 216' and 218'. For instance, second reverse proxy server 210 may analyze the cookie included in the application layer of request messages 216' and 218' to determine the metadata included therein (e.g., username of the user of client 202A, the name of the organization that the user is part of, etc.). Second reverse proxy server 210 stores the determined metadata into the HTTP CONNECT header of request message 216' to generate a modified request message 216". Second reverse proxy server 210 may also remove the cookie from the application layer of request message 216', as the cookie is not needed by destination server 206. Second reverse proxy server 210 may further modify request message 216' to update the HTTP CONNECT method to specify the hostname of the next reverse proxy server (e.g., 3rdreverseproxy.com) in reverse proxy server chain 204 (i.e., third reverse proxy server 212). Modified request message 216" is provided to third reverse proxy server 212 via a transport layer connection 228 established by second reverse proxy server 210. As further shown in FIG. 2, second reverse proxy server 210 modifies request message 218' to generate request message 218" in a similar manner as request message 216', as described above, and provides request message 218" via a transport layer connection 230 established by second reverse proxy server 210. The contents of request message 218" are not shown for the sake of brevity.

In the event that request message 216' does not include metadata (e.g., via a cookie), second reverse proxy server 210 does not establish connection 228 with third reverse proxy server 212. Instead, second reverse proxy server 210 provides a response message (e.g., an HTTP response message) to first client 202A via first reverse proxy server 208 and connections 220 and 224) that redirects client 202A to a login screen that enables the user of client 202A to log in with his user credentials. For example, in an embodiment in which a browser application executing on client 202A issued request message 216, the response message issued by second reverse proxy server 210 would cause the browser application to redirect to a Web page that enables the user to provide his user credentials. Upon providing valid user credentials, the user is authenticated and a new request message including the metadata is transmitted by first client 202A and provided to second reverse proxy server 210 (via first reverse proxy server 208 and connections 220 and 224).

Third reverse proxy server 212 is configured to receive request messages 216" and 218" from second reverse proxy server 210 via connections 228 and 230, respectively. Third reverse proxy server 212 is a transport layer reverse proxy that is configured to analyze and/or interpret both application layer information and transport layer information included in the request messages 216" and 218".

Third reverse proxy server 212 is configured to act as a firewall and determines whether a client (e.g., clients 202A and 202B) is authorized to access destination server 206 based on one or more security rules. For example, the security rule(s) may specify which users, organizations, client applications, ports and/or source addresses are authorized to access destination server 206. Third reverse proxy server 212 is configured to analyze the transport layer of request messages 216" and 218" to determine the user(s) associated with clients 202A and 202B, organization(s) associated with the user(s), the client application(s) that issued request messages 216" and 218", the port(s) to be utilized to communicate with destination server 206, and/or the source address(es) associated clients 202A and 220B.

If the metadata associated with a particular client is in accordance with the security rule(s), then third reverse proxy server 212 determines that the client is authorized to access destination server 206. Third reverse proxy server 212 may modify the request message (e.g., request message 216") to update the HTTP CONNECT method to specify the hostname of the next reverse proxy server (e.g., 4threverseproxy.com) in reverse proxy server chain 204 (i.e., fourth reverse proxy server 214). The modified request message (shown as request message 216''') is provided to fourth reverse proxy server 214 via a transport layer connection 232 established by third reverse proxy server 212.

If the metadata associated with a particular client is not in accordance with the security rule(s), third reverse proxy server 212 terminates the connection thereto that is associated with the client. For example, if third reverse proxy server 212 determines that client 202A is not authorized to access determination server 206, third reverse proxy server 212 terminates transport layer connection 228, thereby preventing client 202A from accessing destination server 206. Third reverse proxy server 212 may terminate transport layer connection 228 by issuing a reset packet (e.g., a TCP RESET packet) back to client 202A. Third reverse proxy server 212 maintains the connections associated with other clients (e.g., client 202B) that have been determined to be authorized to access destination server 206. Conventional techniques utilize a single connection between a reverse proxy and a destination server for all clients providing request messages to the destination server. Thus, if a connection is terminated responsive to a determination that a single client is not authorized to access a destination server, all clients utilizing the connection are also prevented from accessing the destination server. This is detrimental to valid clients that are authorized to access destination server. The techniques described herein advantageously avoid this issue by establishing a respective connection with each client (rather than establishing a single connection for all clients).

As further shown in FIG. 2, third reverse proxy server 212 analyzes request message 218" and/or modifies request message 218" to generate request message 218''' in a similar manner as request message 216''', as described above, and provides request message 218''' via a transport layer connection 234 established by third reverse proxy server 212. The contents of request message 218''' are not shown for the sake of brevity.

In accordance with an embodiment, before terminating a connection, third reverse proxy server 212 provides a notification to second reverse proxy server 210 that causes second reverse proxy server 210 to provide a response message to the unauthorized client. The response message comprises a status code that causes the client to render an error message via display device coupled thereto. For example, the response message may be an HTTP response message comprising the status code (e.g., HTTP status code 400, 401, 403, etc.). The HTTP response message may be received by a browser application executing on the client, which renders a hypertext markup language (HTML) web page displaying an error message corresponding to the status code.

Fourth reverse proxy server 214 is configured to receive request messages 216''' and 218''' and determine whether a client (e.g., clients 202A and 202B) is authorized to perform an operation with respect to a resource provided by destination server 206 based on one or more security rules. For example, the security rule(s) may specify the operations that particular users, organizations, client applications (e.g., a browser application, such as Chrome®) and/or source addresses are authorized perform with respect to particular resources provided by destination server 206. For example, a security rule may specify that a first user of an organization is able to only read a particular resource provided by destination server 206. Another security rule may specify that a second user of the organization is able to read and write a different resource provided by destination server 206. Fourth reverse proxy server 214 is configured to analyze the HTTP CONNECT header information of request messages 216''' and 218''' to determine the user(s) associated with clients 202A and 202B, the organization(s) associated with the user(s), the client application(s) issuing request messages 216''' and 218''') and/or source address(s) associated clients 202A and 202B. Fourth reverse proxy server 214 is also configured to analyze the application layer information of request messages 216''' and 218''' to determine the resource that clients 202A and 202B are attempting to access and the operation to be performed with respect to the resource (e.g., GET (or read)). In particular, fourth reserve proxy server 214 analyzes the path (e.g., "/test/") and resource name (e.g., "example.txt") to determine the resource attempting to be accessed.

If the authentication associated with a particular client is in accordance with the security rule(s), then fourth reverse proxy server 214 determines that the client is authorized to perform the operation with respect to the determined resource provided by destination server 216. Fourth reverse proxy server 214 may modify the request message (e.g., request message 216''') to remove the transport layer information included therein (i.e., the HTTP CONNECT method and its header information) before providing the request message (shown as request message 216'''') to destination server 206. Fourth reverse proxy server 214 provides request message 216'''' via a transport layer connection 236 established by fourth reverse proxy server 214. Fourth reverse proxy server 214 provides request message 216'''' to destination server 206 based on the destination server identifier (e.g., "destinationserver.com") and the port (e.g., 80) included in the application layer information of request message 216''''.

If the metadata associated with a particular client is not in accordance with the security rule(s), fourth reverse proxy server 214 does not provide the request message to destination server 206. Instead, fourth reverse proxy server 214 provides a response message to the client (e.g., via reverse proxy servers 208, 210, and 212) comprising a status code, which causes the client to render an error message via a display device coupled thereto.

As further shown in FIG. 2, fourth reverse proxy server 214 analyzes request message 218''' and/or modifies request message 218''' to generate request message 218'''' in a similar manner as request message 216'''', as described above, and provides request message 218'''' via a transport layer connection 238 established by fourth reverse proxy server 214. The contents of request message 218'''' are not shown for the sake of brevity.

In accordance with an embodiment, fourth reverse proxy server 214 provides request messages 216'''' and 218'''' to a router (not shown), and the router provides the request messages 216'''' and 218'''' to destination server 216. For instance, fourth reverse proxy server 214 may include an HTTP CONNECT header to include the address of the router and forwards request messages 216'''' and 218'''' to the router. The router may be configured to remove the HTTP CONNET method and its header and forward request messages 216'''' and 218'''' to destination server 206 based on the destination server identifier (e.g., "destinationserver.com") and the port (e.g., 80) included in the application layer information of request messages 216'''' and 218''''.

It is noted that in certain embodiments reverse proxy server chain 204 may comprise additional reverse proxy servers or fewer reverse proxy servers depending on the functionality desired. It is further noted that the functionality described above with respect to a particular reverse proxy may be incorporated or combined with another reverse proxy.

Figure 3:
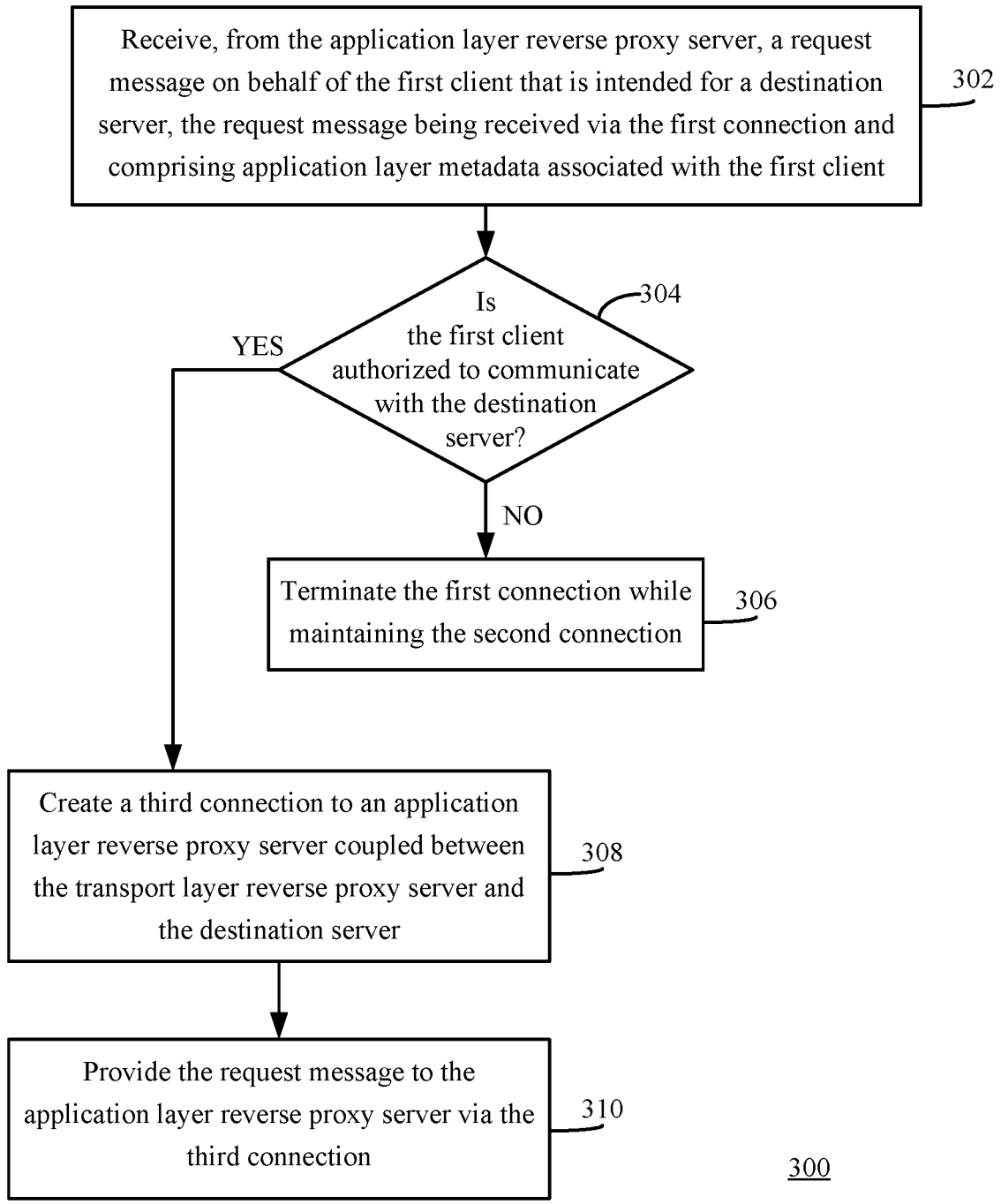
FIG. 3 shows a flowchart of a method for determining whether a client is authorized to access a destination server based on a security rule in accordance with an example embodiment.

Accordingly, security rules may be implemented via a reverse proxy server chain in many ways. For example, FIG. 3 shows a flowchart 300 of a method for determining whether a client is authorized to access a destination server based on a security rule, according to an example embodiment. In an embodiment, flowchart 300 may be implemented by system 200, as described in FIG. 2. In particular, flowchart 300 may be implemented by a transport layer reverse proxy (e.g., third reverse proxy server 212, as shown in FIG. 2) that is coupled to an application layer reverse proxy server (e.g., second reverse proxy server 210) via a first connection (e.g., connections 220, 224, and 228) associated with a first client (e.g., client 202A, as shown in FIG. 2) and is coupled to the application layer reverse proxy server via a second connection (e.g., connections 222, 226, and 230) associated with a second client (e.g., client 202B, as shown in FIG. 2). Accordingly, flowchart 300 will be described with continued reference FIG. 2. Other structural and operational embodiments will be apparent to persons skilled in the relevant art(s) based on the following discussion regarding flowchart 300 and system 200.

Flowchart 300 of FIG. 3 begins with step 302. In step 302, a request message on behalf of the first client that is intended for a destination server is received from the application layer reverse proxy server. The request message is received via the first connection and comprises application layer metadata associated with the first client. For example, with reference to FIG. 2, third reverse proxy server 212 receives request message 216" from second reverse proxy server 210 on behalf of client 202A. Request message 216" is intended for destination server 206. Request message 216" comprises application layer metadata associated with first client 212A. For example, as shown in FIG. 2, request message 216" comprises a username (e.g., "user1") associated with first client 202A, and an organization name ("microsoft") associated with the username, which is based on a cookie stored in the application layer of the request message received by third reverse proxy server 212.

In accordance with one or more embodiments, the transport layer reverse proxy server is TCP reverse proxy server. For example, with reference to FIG. 2, third reverse proxy server 212 is TCP reverse proxy server.

In accordance with one or more embodiments, the application layer metadata is included in an HTTP CONNECT header of the request message. For example, with reference to FIG. 2., second reverse proxy server 210 stores the application layer metadata in a HTTP CONNECT header of request message 216" provided to third reverse proxy server 212. Second reverse proxy server 210 determines the metadata based on analyzing a cookie stored in the application layer of request message 216' received by second reverse proxy server 210.

In accordance with one or more embodiments, the application layer metadata comprises at least one of a username, a password, an organization name, a browser identification (ID), or an internet protocol (IP) address. For example, with reference to FIG. 2, request message 216" a username ("user1"), an organization name ("microsoft"), and an IP address (127.0.0.1).

In step 304, a determination as made as to whether the first client is authorized to communicate with the destination server by applying a first security rule to the application layer metadata. If a determination is made that the first client is not authorized to communicate with the destination server, flow continues to step 306. Otherwise, flow continues to step 308. For example, with reference to FIG. 2, third reverse proxy server 212 determines whether first client 202A is authorized to communicate with destination server 206 by applying a first security rule to the application layer metadata stored in request message 216".

In step 306, the first connection is terminated while maintaining the second connection. For example, with reference to FIG. 2, third reverse proxy server 212 terminates transport layer connection 228 while maintaining transport layer connection 230. That is, if first client 202A is not authorized to communicate with destination server 206 and second client 202B is authorized to communicate with destination server 206, third reverse proxy server 212 only terminates transport layer connection 228 and does not terminate transport layer connection 230.

In step 308, a third connection to an application layer reverse proxy server coupled between the transport layer reverse proxy server and the destination server is created. For example, with reference to FIG. 2, third reverse proxy server 212 creates connection 232 to fourth reverse proxy server 214, which is coupled between third reverse proxy server 212 and destination server 206.

In step 310, the request message is provided to the application layer reverse proxy server coupled between the transport layer reverse proxy server and the destination server via the third connection. For example, with reference to FIG. 2, third reverse proxy server 212 provides request message 216''' to fourth reverse proxy server 214 via transport layer connection 232.

In accordance with one or more embodiments, the application layer reverse proxy server is an HTTP reverse proxy server. For example, with reference to FIG. 2, fourth reverse proxy server 214 is an HTTP reverse proxy server.

Figure 4:
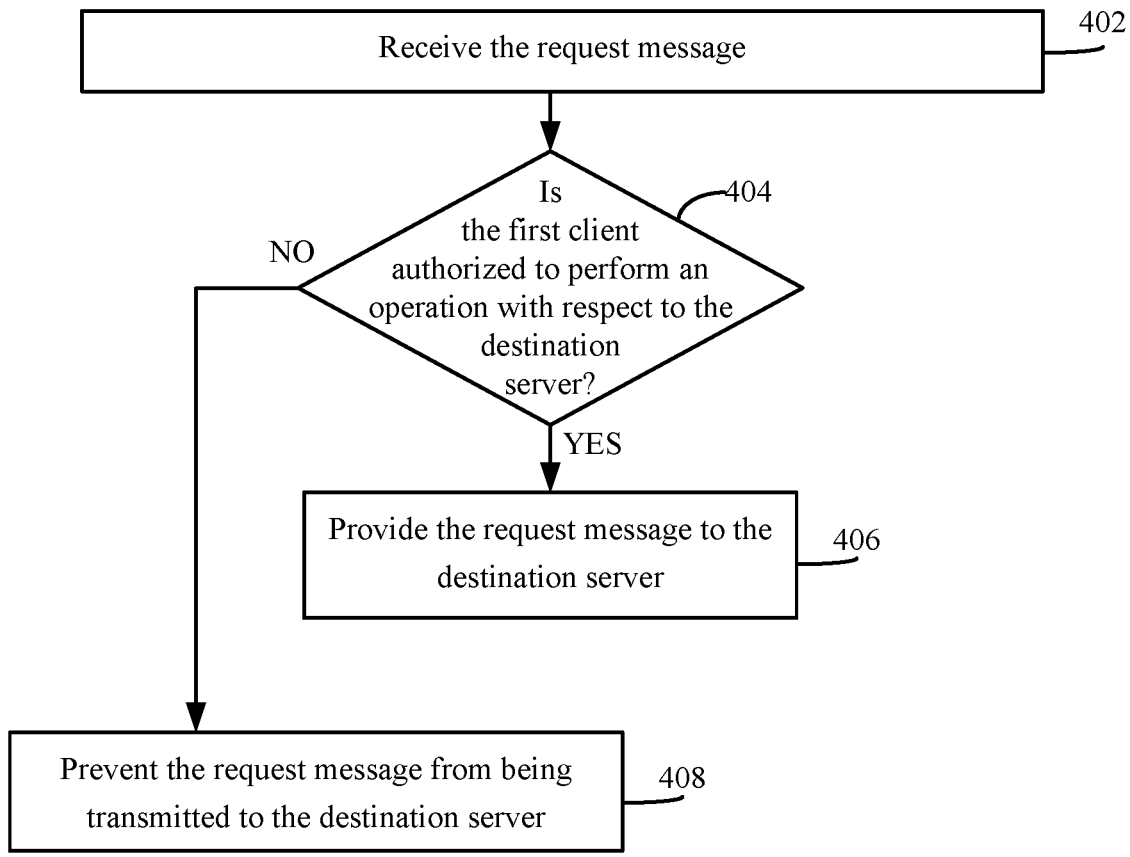
FIG. 4 shows a flowchart of a method for determining whether a client is authorized to perform an operation with respect to a destination server based on a security rule in accordance with an example embodiment.

FIG. 4 shows a flowchart 400 of a method for determining whether a client is authorized to perform an operation with respect to a destination server based on a security rule, according to an example embodiment. In an embodiment, flowchart 400 may be implemented by system 200, as described in FIG. 2. In particular, flowchart 400 may be implemented by an application layer reverse proxy (e.g., fourth reverse proxy server 214, as shown in FIG. 2) that is coupled between the transport layer reverse proxy server (e.g., third reverse proxy server 212) and the destination server (e.g., destination server 206). Accordingly, flowchart 400 will be described with continued reference FIG. 2. Other structural and operational embodiments will be apparent to persons skilled in the relevant art(s) based on the following discussion regarding flowchart 400 and system 200.

Flowchart 400 of FIG. 4 begins with step 402. In step 402, a request message is received. For example, with reference to FIG. 2, fourth reverse proxy server 214 receives request message 216''' from third reverse proxy server 212.

In step 404, a determination is made as to whether the first client is authorized to perform an operation with respect to the destination server by applying a second security rule to the application layer metadata. The operation is specified by the request message. If a determination is made that the first client is authorized to perform the operation, flow continues to step 406. Otherwise, flow continues to step 408. For example, with reference to FIG. 2, fourth reverse proxy server 214 determines whether first client 202A is authorized to perform an operation with respect to destination server 206 by applying a second security rule to the application layer metadata included in the HTTP CONNECT method header in request message 216'''. As also shown in FIG. 2, the operation and the resource on which the operation is to be performed are specified in the application layer of request message 216''' (i.e., "GET/test/example.txt"). The GET operation is configured to read a resource provided via destination server 206. It is noted that the GET operation is just one example operation, and that other operations may be performed and analyzed. Such operations include, but are not limited to POST (which creates a resource), PUT (which updates or replaces a resource), DELETE (which deletes a resource), etc.

In step 406, the request message is provided to the destination server. For example, with reference to FIG. 2, fourth reverse proxy server 214 removes the HTTP CONNECT method and its header information from request message 216''' and provides the modified request message (i.e., request message 216'''') to destination server via transport layer connection 236.

In step 408, the request message is prevented from being transmitted to the destination server. For example, with reference to FIG. 2, fourth reverse proxy server 214 does not transmit request message request message 216''' to destination server 206. Instead, fourth reverse proxy server 214 may provide a response message to first client 202A (e.g., via reverse proxy servers 208, 210, and 212) comprising a status code (e.g., HTTP status code 400, 401, 403, etc.), which causes the client to render an error message via a display device coupled thereto.

Figure 5:
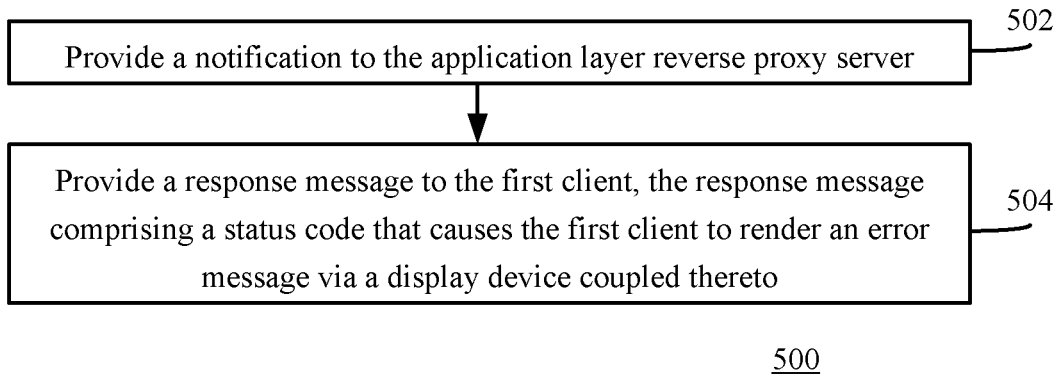
FIG. 5 shows a flowchart of a method for notifying a client that a transport layer connection established for communication with a destination server has been terminated in accordance with an example embodiment.
Figure 6:
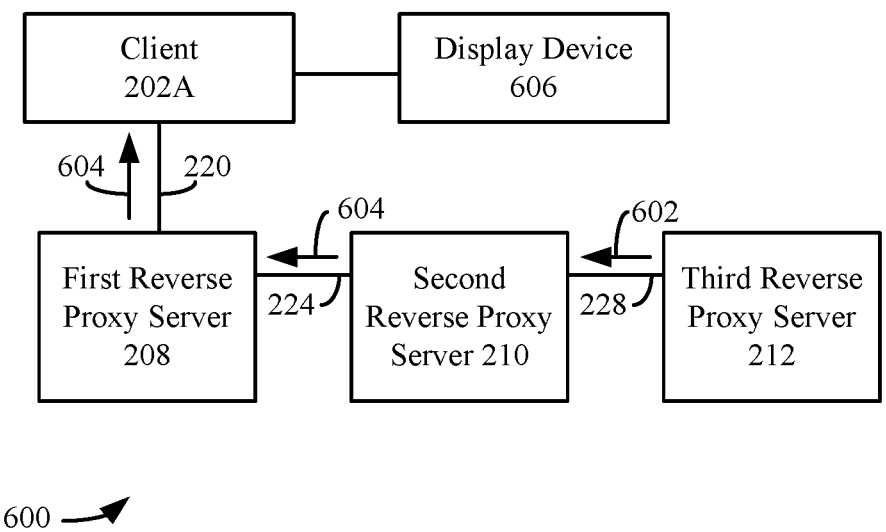
FIG. 6 shows a block diagram for notifying a client that a transport layer connection established for communication with a destination server has been terminated in accordance with an example embodiment.

FIG. 5 shows a flowchart 500 of a method for notifying a client that a transport layer connection established for communication with a destination server has been terminated, according to an example embodiment. In an embodiment, flowchart 500 may be implemented by system 600, as described in FIG. 6. FIG. 6 is a system 600 for notifying a client that a transport layer connection established for communication with a destination server has been terminated in accordance with an example embodiment. As shown in FIG. 6, system 600 comprises a client 202A, first reverse proxy server 208, second reverse proxy server 210, third reverse proxy server 212, and a display device 606. Display device 606 is coupled to client 202A. Display device 606 may be integrated with client 202A, or alternatively, may be an external component that is coupled to client 202A via a wired or wireless connection. Examples of display device 606 include, but are not limited to, a display screen (e.g., an LED display screen, an OLED display screen, an LCD display screen, etc.), a monitor, a television, a projector, etc. Other components shown and described with reference to FIG. 2 are not shown for brevity. Flowchart 500 will be described with reference FIG. 6. Other structural and operational embodiments will be apparent to persons skilled in the relevant art(s) based on the following discussion regarding flowchart 500 and system 600.

Flowchart 500 of FIG. 5 begins with step 502. In step 502, responsive to determining that the first client is not authorized to communicate with the destination server, a notification is provided to the application layer reverse proxy server. For example, with reference to FIG. 6, third reverse proxy server 212 provides a notification 602 (via transport layer connection 228) to second reverse proxy server 210, which is coupled between third reverse proxy server 212 and first client 202A. Third reverse proxy server 212 provides notification 602 responsive to determining that first client 202A is not authorized to communicate with the destination server (e.g., destination server 206, as shown in FIG. 2).

In step 504, responsive to receiving the notification, a response message is provided to the first client, the response message comprising a status code that causes the first client to render an error message via a display device coupled thereto. For example, with reference to FIG. 6, second reverse proxy server 210 provides a response message 604 to first reverse proxy server 208 via transport layer connection 224, and first reverse proxy server 208 provides response message 604 to first client 202A via transport layer connection 220. Response message 604 comprises a status code (e.g., HTTP status code 400, 401, 403, etc.) that causes first client 202A to render an error message via display device 606 coupled to first client 202A. For instance, in an embodiment in which a browser application executing on first client 202A receives response message 604, the browser application may cause an error message corresponding to the status code to be displayed in a browser window rendered on display device 606. The foregoing techniques advantageously provide an advanced notification to the user that a transport layer connection (e.g., transport layer connection 228) is being terminated.

III. Example Computer System Implementation

Clients 102A-102N, reverse proxy server chain 104, destination server 106, clients 202A and 202B, reverse proxy server chain 204, first reverse proxy server 208, second reverse proxy server 210, third reverse proxy server 212, fourth reverse proxy server 214, and/or destination server 206 (and/or any of the components described therein), and/or flowcharts 300, 400, and/or 500, may be implemented in hardware, or hardware combined with one or both of software and/or firmware. For example, clients 102A-102N, reverse proxy server chain 104, destination server 106, clients 202A and 202B, reverse proxy server chain 204, first reverse proxy server 208, second reverse proxy server 210, third reverse proxy server 212, fourth reverse proxy server 214, and/or destination server 206 (and/or any of the components described therein), and/or flowcharts 300, 400, and/or 500 may be implemented as computer program code/instructions configured to be executed in one or more processors and stored in a computer readable storage medium.

Alternatively, clients 102A-102N, reverse proxy server chain 104, destination server 106, clients 202A and 202B, reverse proxy server chain 204, first reverse proxy server 208, second reverse proxy server 210, third reverse proxy server 212, fourth reverse proxy server 214, and/or destination server 206 (and/or any of the components described therein), and/or flowcharts 300, 400, and/or 500 may be implemented as hardware logic/electrical circuitry.

For instance, in an embodiment, one or more, in any combination, of clients 102A-102N, reverse proxy server chain 104, destination server 106, clients 202A and 202B, reverse proxy server chain 204, first reverse proxy server 208, second reverse proxy server 210, third reverse proxy server 212, fourth reverse proxy server 214, and/or destination server 206 (and/or any of the components described therein), and/or flowcharts 300, 400, and/or 500 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
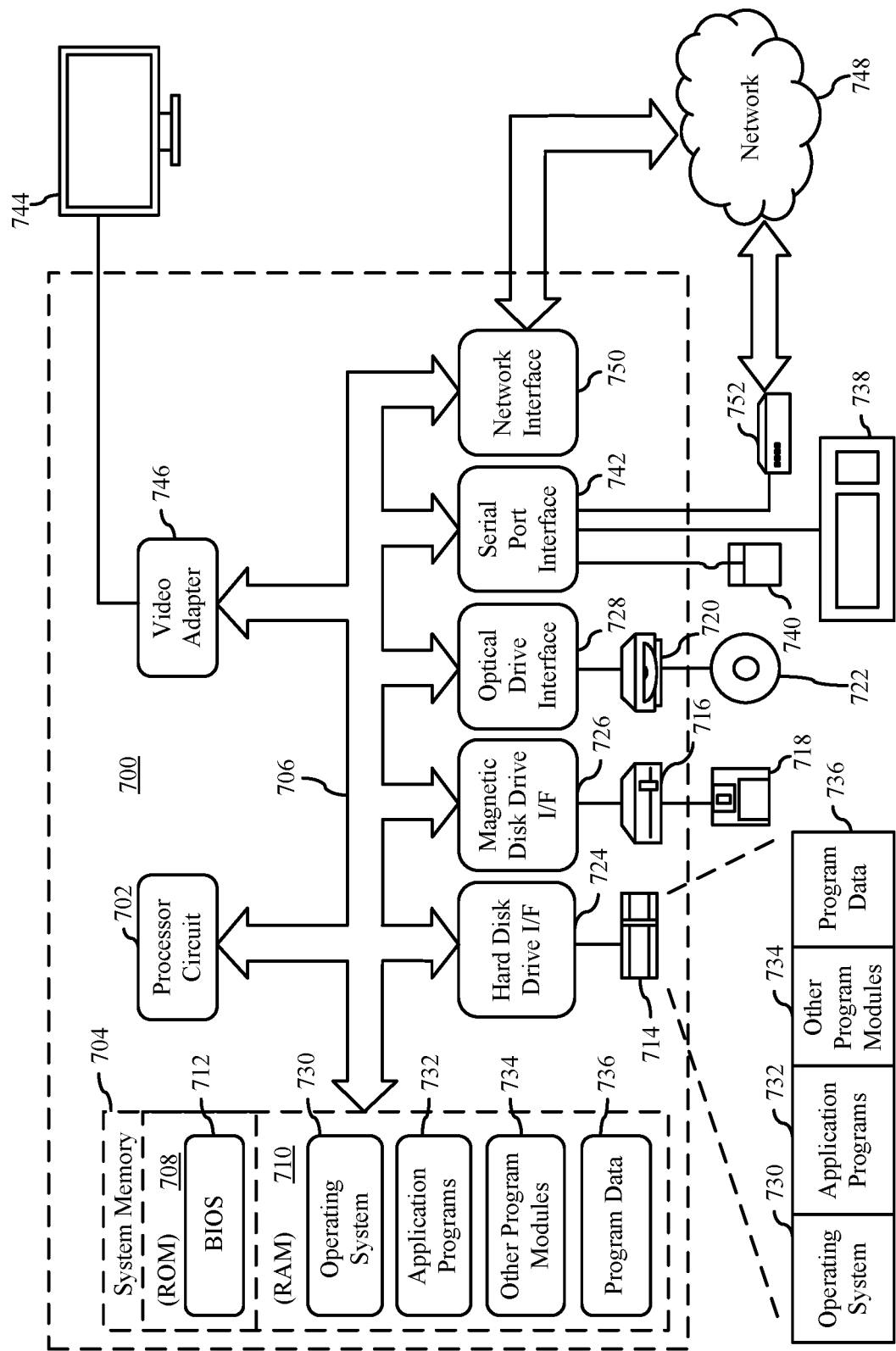
FIG. 7 is a block diagram of an example processor-based computer system that may be used to implement various embodiments.

FIG. 7 depicts an exemplary implementation of a computing device 700 in which embodiments may be implemented. For example, clients 102A-102N, reverse proxy server chain 104, destination server 106, clients 202A and 202B, reverse proxy server chain 204, first reverse proxy server 208, second reverse proxy server 210, third reverse proxy server 212, fourth reverse proxy server 214, and/or destination server 206 (and/or any of the components described therein), and/or flowcharts 300, 400, and/or 500 may be implemented in one or more computing devices similar to computing device 700 in stationary or mobile computer embodiments, including one or more features of computing device 700 and/or alternative features. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing any of the features of Clients 102A-102N, reverse proxy server chain 104, destination server 106, clients 202A and 202B, reverse proxy server chain 204, first reverse proxy server 208, second reverse proxy server 210, third reverse proxy server 212, fourth reverse proxy server 214, and/or destination server 206 (and/or any of the components described therein), and/or flowcharts 300, 400, and/or 500, and/or further embodiments described herein.

A user may enter commands and information into computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A method is described herein. The method comprises: performing by a transport layer reverse proxy server that is coupled to an application layer reverse proxy server via a first connection associated with a first client and is coupled to the application layer reverse proxy server via a second connection associated with a second client: receiving, from the application layer reverse proxy server, a request message on behalf of the first client that is intended for a destination server, the request message being received via the first connection and comprising application layer metadata associated with the first client; determining whether the first client is authorized to communicate with the destination server by applying a first security rule to the application layer metadata; and responsive to determining that the first client is not authorized to communicate with the destination server, terminating the first connection while maintaining the second connection.

In one embodiment of the foregoing method, the method further comprises: further performing by the transport layer reverse proxy server: responsive to determining that the first client is authorized to communicate with the destination server: creating a third connection to an application layer reverse proxy server coupled between the transport layer reverse proxy server and the destination server; and providing the request message to the application layer reverse proxy server coupled between the transport layer reverse proxy server and the destination server via the third connection.

In one embodiment of the foregoing method, the method further comprises: performing by the application layer reverse proxy server coupled between the transport layer reverse proxy server and the destination server: receiving the request message; determining whether the first client is authorized to perform an operation with respect to the destination server by applying a second security rule to the application layer metadata, the operation being specified by the request message, the operation being specified by the request message; responsive to determining that the first client is authorized to perform the operation with respect to the destination server, providing the request message to the destination server; and responsive to determining that the first client is not authorized to perform the operation with respect to the destination server, preventing the request message from being transmitted to the destination server.

In one embodiment of the foregoing method, the method further comprises: further performing by the transport layer reverse proxy server: responsive to determining that the first client is not authorized to communicate with the destination server, providing a notification to the application layer reverse proxy server; and performing by the application layer reverse proxy server: responsive to receiving the notification, providing a response message to the first client, the response message comprising a status code that causes the first client to render an error message via a display device coupled thereto.

In one embodiment of the foregoing method, the application layer metadata is included in a hypertext transfer protocol (HTTP) connect header of the request message.

In one embodiment of the foregoing method, the application layer metadata comprises at least one of: a username; a password; an organization name; a browser identification (ID); or an internet protocol (IP) address.

In one embodiment of the foregoing method, the transport layer reverse proxy server is a transmission control protocol (TCP) reverse proxy server.

In one embodiment of the foregoing method, the application layer reverse proxy server is a hypertext transfer protocol (HTTP) reverse proxy server.

A system is also described herein. The system includes an application layer reverse proxy server coupled to a first client and a second client; and a transport layer reverse proxy server that is coupled to the application layer reverse proxy server via a first connection associated with the first client and is coupled to the application layer reverse proxy server via a second connection associated with the second client, the transport layer reverse proxy server comprising: a first processor circuit; and a first memory that stores first program code configured to be executed by the first processor circuit, the first program code being configured to, when executed by the first processor circuit: receive, from the application layer reverse proxy server, a request message on behalf of the first client that is intended for a destination server, the request message being received via the first connection and comprising application layer metadata associated with the first client; determine whether the first client is authorized to communicate with the destination server by applying a first security rule to the application layer metadata; and responsive to determining that the first client is not authorized to communicate with the destination server, terminate the first connection while maintaining the second connection.

In one embodiment of the foregoing system, the first program code further configured to, when executed by the first processor circuit: responsive to determining that the first client is authorized to communicate with the destination server: create a third connection to an application layer reverse proxy server coupled between the transport layer reverse proxy server and the destination server; and provide the request message to the application layer reverse proxy server coupled between the transport layer reverse proxy server and the destination server via the third connection.

In one embodiment of the foregoing system, the application layer reverse proxy server coupled between the transport layer reverse proxy server and the destination server comprises: a second processor circuit; and a second memory that stores second program code configured to be executed by the second processor circuit, the second program code being configured to, when executed by the second processor circuit: receive the request message; determine whether the first client is authorized to perform an operation with respect to the destination server by applying a second security rule to the application layer metadata, the operation being specified by the request message; responsive to determining that the first client is authorized to perform the operation with respect to the destination server, provide the request message to the destination server; and responsive to determining that the first client is not authorized to perform the operation with respect to the destination server, prevent the request message from being transmitted to the destination server.

In one embodiment of the foregoing system, the first program code further configured to, when executed by the first processor circuit: responsive to determining that the first client is not authorized to communicate with the destination server, provide a notification to the application layer reverse proxy server, the application layer reverse proxy server comprising: a second processor circuit; and a second memory that stores second program code configured to be executed by the second processor circuit, the second program code being configured to, when executed by the second processor circuit: responsive to receiving the notification, provide a response message to the first client, the response message comprising a status code that causes the first client to render an error message via a display device coupled thereto.

In one embodiment of the foregoing system, the application layer metadata is included in a hypertext transfer protocol (HTTP) connect header of the request message.

In one embodiment of the foregoing system, the application layer metadata comprises at least one of: a username; a password; an organization name; a browser identification (ID); or an internet protocol (IP) address.

In one embodiment of the foregoing system, the transport layer reverse proxy server is a transmission control protocol (TCP) reverse proxy server.

In one embodiment of the foregoing system, the application layer reverse proxy server is a hypertext transfer protocol (HTTP) reverse proxy server.

A computer-readable storage medium having program instructions recorded thereon that, when executed by at least one processor of a computing device coupled to an application layer reverse proxy server via a first connection associated with a first client and is coupled to the application layer reverse proxy server via a second connection associated with a second client, perform a method, the method comprising. The method comprises: receiving, from the application layer reverse proxy server, a request message on behalf of the first client that is intended for a destination server, the request message being received via the first connection and comprising application layer metadata associated with the first client; determining whether the first client is authorized to communicate with the destination server by applying a first security rule to the application layer metadata; and responsive to determining that the first client is not authorized to communicate with the destination server, terminating the first connection while maintaining the second connection.

In one embodiment of the foregoing computer-readable storage medium, the method further comprises: responsive to determining that the first client is authorized to communicate with the destination server: creating a third connection to an application layer reverse proxy server coupled between the computing device and the destination server; and providing the request message to the application layer reverse proxy server coupled between the computing device and the destination server via the third connection.

In one embodiment of the foregoing computer-readable storage medium, the application layer metadata comprises at least one of: a username; a password; an organization name; a browser identification (ID); or an internet protocol (IP) address.

In one embodiment of the foregoing computer-readable storage medium, the computing device is configured as a transmission control protocol (TCP) reverse proxy server.

V. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:
1. A method, comprising:
performing by a transport layer reverse proxy server that is coupled to a first application layer reverse proxy server via a first connection associated with a first client and is coupled to the first application layer reverse proxy server via a second connection associated with a second client:
  receiving, from the first application layer reverse proxy server, a request message on behalf of the first client that is intended for a destination server, the request message being received via the first connection and comprising application layer metadata in a transport layer of the request message, the application layer metadata associated with the first client;
  determining whether the first client is authorized to communicate with the destination server by applying a first security rule to the application layer metadata; and
  responsive to determining that the first client is not authorized to communicate with the destination server, terminating the first connection while maintaining the second connection.

2. The method of claim 1, further comprising:
further performing by the transport layer reverse proxy server:
  responsive to determining that the first client is authorized to communicate with the destination server:
    creating a third connection to a second application layer reverse proxy server coupled between the transport layer reverse proxy server and the destination server; and
    providing the request message to the second application layer reverse proxy server via the third connection.

3. The method of claim 2, further comprising:
performing by the second application layer reverse proxy server:
  receiving the request message;
  determining whether the first client is authorized to perform an operation with respect to the destination server by applying a second security rule to the application layer metadata, the operation being specified by the request message;
  responsive to determining that the first client is authorized to perform the operation with respect to the destination server, providing the request message to the destination server; and
  responsive to determining that the first client is not authorized to perform the operation with respect to the destination server, preventing the request message from being transmitted to the destination server.

4. The method of claim 1, further comprising:
further performing by the transport layer reverse proxy server:
  responsive to determining that the first client is not authorized to communicate with the destination server, providing a notification to the first application layer reverse proxy server; and
performing by the first application layer reverse proxy server:
  responsive to receiving the notification, providing a response message to the first client, the response message comprising a status code that causes the first client to render an error message via a display device coupled thereto.

5. The method of claim 1, wherein the application layer metadata is included in a hypertext transfer protocol (HTTP) connect header of the request message.

6. The method of claim 1, wherein the application layer metadata comprises at least one of:
  a username;
  a password;
  an organization name;
  a browser identification (ID); or
  an internet protocol (IP) address.

7. The method of claim 1, wherein the transport layer reverse proxy server is a transmission control protocol (TCP) reverse proxy server.

8. The method of claim 1, wherein the first application layer reverse proxy server is a hypertext transfer protocol (HTTP) reverse proxy server.

9. A system, comprising:
  a first application layer reverse proxy server coupled to a first client and a second client; and
  a transport layer reverse proxy server that is coupled to the first application layer reverse proxy server via a first connection associated with the first client and is coupled to the first application layer reverse proxy server via a second connection associated with the second client, the transport layer reverse proxy server comprising:
    a first processor circuit; and
    a first memory that stores first program code, that when executed by the first processor circuit,
      receives, from the first application layer reverse proxy server, a request message on behalf of the first client that is intended for a destination server, the request message being received via the first connection and comprising application layer metadata in a transport layer of the request message, the application layer metadata, associated with the first client;
      determines whether the first client is authorized to communicate with the destination server by applying a first security rule to the application layer metadata; and
      responsive to determining that the first client is not authorized to communicate with the destination server, terminates the first connection while maintaining the second connection.

10. The system of claim 9, the first program code, when executed by the first processor circuit, further:
  responsive to determining that the first client is authorized to communicate with the destination server:
    creates a third connection to a second application layer reverse proxy server coupled between the transport layer reverse proxy server and the destination server; and
    provides the request message to the second application layer reverse proxy server via the third connection.

11. The system of claim 10, wherein the second application layer reverse proxy server comprises:
  a second processor circuit; and
  a second memory that stores second program code that, when executed by the second processor circuit, further:
    receives the request message from the transport layer reverse proxy server;
    determines whether the first client is authorized to perform an operation with respect to the destination server by applying a second security rule to the application layer metadata, the operation being specified by the request message;
    responsive to determining that the first client is authorized to perform the operation with respect to the destination server, provides the request message to the destination server; and
    responsive to determining that the first client is not authorized to perform the operation with respect to the destination server, prevents the request message from being transmitted to the destination server.

12. The system of claim 9, the first program code, when executed by the first processor circuit, further:
responsive to determining that the first client is not authorized to communicate with the destination server, provides a notification to the first application layer reverse proxy server,
the first application layer reverse proxy server comprising:
a second processor circuit; and
a second memory that stores second program code that, when executed by the second processor circuit, responsive to receiving the notification, provides a response message to the first client, the response message comprising a status code that causes the first client to render an error message via a display device coupled thereto.

13. The system of claim 9, wherein the application layer metadata is included in a hypertext transfer protocol (HTTP) connect header of the request message.

14. The system of claim 9, wherein the application layer metadata comprises at least one of:
a username;
a password;
an organization name;
a browser identification (ID); or
an into net protocol (IP) address.

15. The system of claim 9, wherein the transport layer reverse proxy server is a transmission control protocol (TCP) reverse proxy server.

16. The system of claim 9, wherein the first application layer reverse proxy server is a hypertext transfer protocol (HTTP) reverse proxy server.

17. A computer-readable storage medium having program instructions recorded thereon that, when executed by at least one processor of a computing device coupled to first application layer reverse proxy server via a first connection associated with a first client and is coupled to the first application layer reverse proxy server via a second connection associated with a second client, perform a method, the method comprising:
receiving, from the first application layer reverse proxy server, a request message on behalf of the first client that is intended for a destination server, the request message being received via the first connection and comprising application layer metadata in a transport layer of the request message the application layer metadata associated with the first client;
determining whether the first client is authorized to communicate with the destination server by applying a first security rule to the application layer metadata; and
responsive to determining that the first client is not authorized to communicate with the destination server, terminating the first connection while maintaining the second connection.

18. The computer-readable storage medium of claim 17, the method further comprising:
responsive to determining that the first client is authorized to communicate with the destination server:
creating a third connection to a second application layer reverse proxy server coupled between the computing device and the destination server; and
providing the request message to the second application layer reverse proxy server via the third connection.

19. The computer-readable storage medium of claim 17, wherein the application layer metadata comprises at least one of:
a username;
a password;
an organization name;
a browser identification (ID); or
an internee protocol (IP) address.

20. The computer-readable storage medium of claim 17, wherein the computing device is a transmission control protocol (TCP) reverse proxy server.

* * * * *